United States Patent
Egawa et al.

(10) Patent No.: US 9,250,502 B2
(45) Date of Patent: Feb. 2, 2016

(54) PROJECTOR HAVING BASE AND COVER MEMBER FORMING COOLING DUCT FOR COOLING LIGHT MODULATORS AND METHOD FOR MANUFACTURING PROJECTOR

(75) Inventors: Akira Egawa, Shiojiri (JP); Kaname Nagatani, Matsumoto (JP); Kunihiko Takagi, Okaya (JP); Tetsuo Shimizu, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 291 days.

(21) Appl. No.: 12/851,828

(22) Filed: Aug. 6, 2010

(65) Prior Publication Data

US 2011/0032486 A1 Feb. 10, 2011

(30) Foreign Application Priority Data

Aug. 10, 2009 (JP) ................. 2009-185501

(51) Int. Cl.
*G03B 21/16* (2006.01)
*H04N 9/31* (2006.01)
*G03B 21/14* (2006.01)
*G03B 21/20* (2006.01)

(52) U.S. Cl.
CPC .............. *G03B 21/16* (2013.01); *H04N 9/3105* (2013.01); *H04N 9/3144* (2013.01); *G03B 21/145* (2013.01); *G03B 21/2073* (2013.01); *Y10T 29/49826* (2015.01)

(58) Field of Classification Search
CPC .. G03B 21/16; G03B 21/2073; H04N 9/3144; H04N 9/3105
USPC ........... 353/52, 53, 54, 55, 56, 57, 58, 59, 60, 353/61
See application file for complete search history.

(56) References Cited

U.S. PATENT DOCUMENTS

| | | | |
|---|---|---|---|
| 6,935,745 B1 * | 8/2005 | Kitabayashi et al. | 353/20 |
| RE40,450 E * | 8/2008 | Fujimori | 349/60 |
| 2002/0075457 A1 * | 6/2002 | Wang et al. | 353/61 |
| 2005/0001985 A1 * | 1/2005 | Kitabayashi | 353/31 |
| 2005/0018151 A1 * | 1/2005 | Kitabayashi et al. | 353/119 |
| 2005/0162621 A1 * | 7/2005 | Shirota | 353/81 |
| 2011/0019159 A1 | 1/2011 | Egawa et al. | |
| 2011/0025984 A1 | 2/2011 | Takagi et al. | |

FOREIGN PATENT DOCUMENTS

| | | |
|---|---|---|
| CN | 1627127 A | 6/2005 |
| CN | 1645247 A | 7/2005 |
| CN | 1743947 A | 3/2006 |

(Continued)

*Primary Examiner* — Bao-Luan Le
(74) *Attorney, Agent, or Firm* — ALG Intellectual Property, LLC

(57) ABSTRACT

A projector includes: a spatial light modulator provided for each color light flux and configured to modulate the light flux in accordance with an image signal; a light combining system configured to combine the color light flux outputted from the spatial light modulator; a projection system configured to project the light combined by the light combining system; a fixing member configured to integrally fix the spatial light modulator, the light combining system, and the projection system; a base on which the spatial light modulators and the light combining system fixed to the fixing member are mounted; and a cover member configured to cover the spatial light modulator and the light combining system mounted on the base, wherein the base and the cover member form a cooling duct through which cooling air for sequentially cooling the spatial light modulator for the respective color light flux flows.

11 Claims, 11 Drawing Sheets

(56) References Cited

FOREIGN PATENT DOCUMENTS

| JP | 10-239783 A | 9/1998 |
| JP | 2001-281613 A | 10/2001 |
| JP | 2002-221648 A | 8/2002 |
| JP | 2005-208318 A | 8/2005 |
| JP | 2007-057598 A | 3/2007 |
| JP | 2009-150975 A | 7/2009 |

* cited by examiner

PROJECTOR HAVING BASE AND COVER MEMBER FORMING COOLING DUCT FOR COOLING LIGHT MODULATORS AND METHOD FOR MANUFACTURING PROJECTOR

BACKGROUND

1. Technical Field

The present invention relates to a projector and a method for manufacturing the same, and particularly to a projector including a liquid crystal display panel.

2. Related Art

Developments of projectors have been intended to improve projection performance and reduce their sizes. Projectors including, for example, transmissive liquid crystal display panels for red (R) light, green (G) light, and blue (B) light are widely used. The liquid crystal display panels absorb illumination light and generate heat. To dissipate the heat generated in the liquid crystal display panels, for example, a fan that allows cooling air to flow is used.

In a known structure for cooling a projector, cooling air flows in a direction substantially perpendicular to a plane containing optical axes in which liquid crystal display panels are disposed. In this case, the cooling air is readily supplied uniformly to the liquid crystal display panels, whereas fans and ducts that allow the cooling air to flow disposed above and below the respective liquid crystal display panels disadvantageously make it difficult to reduce the thickness of the projector. In a technology having been proposed to solve the problem, a flow path along which the cooling air flows in a direction substantially parallel to the plane containing the optical axes is provided, and the cooling air sequentially cools the liquid crystal display panels and associated polarizers. For example, JP-A-2001-281613 proposes a configuration in which liquid crystal display panels are disposed around a cross dichroic prism, which is a light combining system, and flow paths are provided on the light-incident side and the light-exiting side of the liquid crystal display panels.

Liquid crystal display panels, a cross dichroic prism, and a projection lens, which are optical components, are positioned with respect to each other and then fixed to ensure optical characteristics necessary for a projector. When the technology described in JP-A-2001-281613 is employed, it is a challenge to assemble a configuration for fixing the optical components in the projector and a configuration for cooling the optical components.

SUMMARY

An advantage of some aspects of the invention is to provide not only a projector including a cooling structure that allows the thickness of the projector to be reduced and a configuration that allows optical components to be fixed but also a method for manufacturing the projector.

A projector according to an aspect of the invention includes a spatial light modulator provided for each color light flux and configured to modulate the light flux in accordance with an image signal, a light combining system configured to combine the color light fluxes outputted from the spatial light modulators, a projection system configured to project the light combined by the light combining system, a fixing member configured to integrally fix the spatial light modulator, the light combining system, and the projection system, a base on which the spatial light modulator and the light combining system fixed to the fixing member are mounted, and a cover member configured to cover the spatial light modulator and the light combining system mounted on the base. The base and the cover member form a cooling duct through which cooling air for sequentially cooling the spatial light modulator for the respective color light flux flows.

The spatial light modulator, the light combining system, and the projection system are positioned with respect to each other and fixed to the fixing member. The cooling duct formed of the base and the cover member causes the cooling air to flow around the light combining system and sequentially travel through the vicinities of the spatial light modulator. The resultant projector includes a cooling structure that allows the thickness of the projector to be reduced and a configuration that allows optical components to be fixed.

A projector according to another aspect of the invention includes a spatial light modulator provided for each color light flux and configured to modulate the light flux in accordance with an image signal, a light combining system configured to combine the color light fluxes outputted from the spatial light modulators, a projection system configured to project the light combined by the light combining system, a fixing member configured to integrally fixes the spatial light modulator and the light combining system, a base on which the spatial light modulator and the light combining system fixed to the fixing member are mounted and to which the projection system is fixed, and a cover member configured to cover the spatial light modulator and the light combining system mounted on the base. The base and the cover member form a cooling duct through which cooling air for sequentially cooling the spatial light modulator for the respective color light flux flows.

The spatial light modulator and the light combining system are positioned with respect to each other and fixed to the fixing member. The spatial light modulator and the light combining system fixed to the fixing member and the projection system are positioned with respect to each other and fixed to the base. The cooling duct formed of the base and the cover member causes the cooling air to flow around the light combining system and sequentially travel through the vicinities of the spatial light modulator. The resultant projector includes a cooling structure that allows the thickness of the projector to be reduced and a configuration that allows optical components to be fixed.

In a preferred embodiment of the invention, it is preferable that the projector further includes a support frame configured to support the spatial light modulator and the fixing member has a support frame fixing portion configured to fix each of the support frame. The spatial light modulator can thus be fixed to the fixing member via the support frame.

In a preferred embodiment of the invention, it is preferable that the support frame has an attachment portion configured to allow the support frame fixing portion to be attached to the support frame, and the spatial light modulator is fixed after the position thereof relative to the light combining system is adjusted in response to the gap between the attachment portion and the support frame fixing portion. In this way, the light combining system and the spatial light modulator can be fixed in a simple configuration in such a way that they are precisely positioned with respect to each other.

In a preferred embodiment of the invention, it is preferable that the projector further includes a light-exiting-side polarizer provided for the respective color light flux and on which the light flux outputted from the spatial light modulator is incident, and that the light-exiting-side polarizer is attached to the fixing member. The light-exiting-side polarizer can thus be fixed in the optical paths between the spatial light modulator and the light combining system.

In a preferred embodiment of the invention, it is preferable that the projector further includes a light-incident-side polarizer provided for the respective color light flux and on which light flux traveling toward the spatial light modulator is incident, and the light-incident-side polarizer is disposed in sidewall portions that form the sidewall of the cooling duct and face the spatial light modulator. In this way, the light-exiting surface of the light-incident-side polarizer form part of the cooling duct, and the cooling air can cool the light-incident-side polarizer.

In a preferred embodiment of the invention, it is preferable that the projector further includes a light-incident-side polarizer frame configured to allow the light-incident-side polarizer to be attached to the corresponding sidewall portion, and the light-incident-side polarizer frame is fixed to the sidewall portion after the inclination of the corresponding light-incident-side polarizer is adjusted in the rotational direction around an optical axis. In this way, the orientation of the axis of polarization of the light-incident-side polarizer can be finely adjusted in a simple configuration, whereby the light-incident-side polarizer can be fixed with the inclination thereof precisely adjusted.

In a preferred embodiment of the invention, it is preferable that the projector further includes a rectifying mechanism provided between the spatial light modulator and causing the cooling air to flow through the light-incident side and the light-exiting side of the spatial light modulator. The rectifying mechanism cause the cooling air to travel toward both the light-incident side and the light-exiting side of the spatial light modulators and can hence efficiently cool the light-incident-side polarizer, the spatial light modulator, and the light-exiting-side polarizer.

In a preferred embodiment of the invention, it is preferable that the rectifying mechanism is attached to either the base or the cover member. As a result, the cooling duct including the rectifying mechanism is formed by combining the base and the cover member.

In a preferred embodiment of the invention, it is preferable that the projector further includes a cooling air supplier configured to supply the cooling air. The cooling air supplier causes the cooling air to flow through the cooling duct.

A method for manufacturing a projector according to still another aspect of the invention is a method for manufacturing a projector including a spatial light modulator provided for each color light flux and configured to modulate the light flux in accordance with an image signal, a light combining system configured to combine the color light flux outputted from the spatial light modulator, and a projection system configured to project the light combined by the light combining system. The method includes integrally fixing the spatial light modulators, the light combining system, and the projection system using a fixing member, mounting the spatial light modulator and the light combining system fixed to the fixing member on a base, and covering the spatial light modulator and the light combining system mounted on the base with a cover member. The base and the cover member form a cooling duct through which cooling air for sequentially cooling the spatial light modulator for the respective color light flux flows. The resultant projector includes a cooling structure that allows the thickness of the projector to be reduced and a configuration that allows optical components to be fixed.

A method for manufacturing a projector according to yet another aspect of the invention is a method for manufacturing a projector including a spatial light modulator provided for each color light flux and configured to modulate the light flux in accordance with an image signal, a light combining system configured to combine the color light flux outputted from the spatial light modulator, and a projection system configured to project the light combined by the light combining system. The method includes fixing the projection system to a base, mounting the light combining system fixed to a fixing member on the base, integrally fixing the spatial light modulator and the light combining system to the fixing member by attaching the spatial light modulator to the fixing member, and covering the spatial light modulator and the light combining system mounted on the base with a cover member. The base and the cover member form a cooling duct through which cooling air for sequentially cooling the spatial light modulator for the respective color light flux flows. The resultant projector includes a cooling structure that allows the thickness of the projector to be reduced and a configuration that allows optical components to be fixed.

BRIEF DESCRIPTION OF THE DRAWINGS

The invention will be described with reference to the accompanying drawings, wherein like numbers refer to like elements.

DESCRIPTION OF EXEMPLARY EMBODIMENTS

Embodiments of the invention will be described below in detail with reference to the drawings.

First Embodiment

Figure 1:
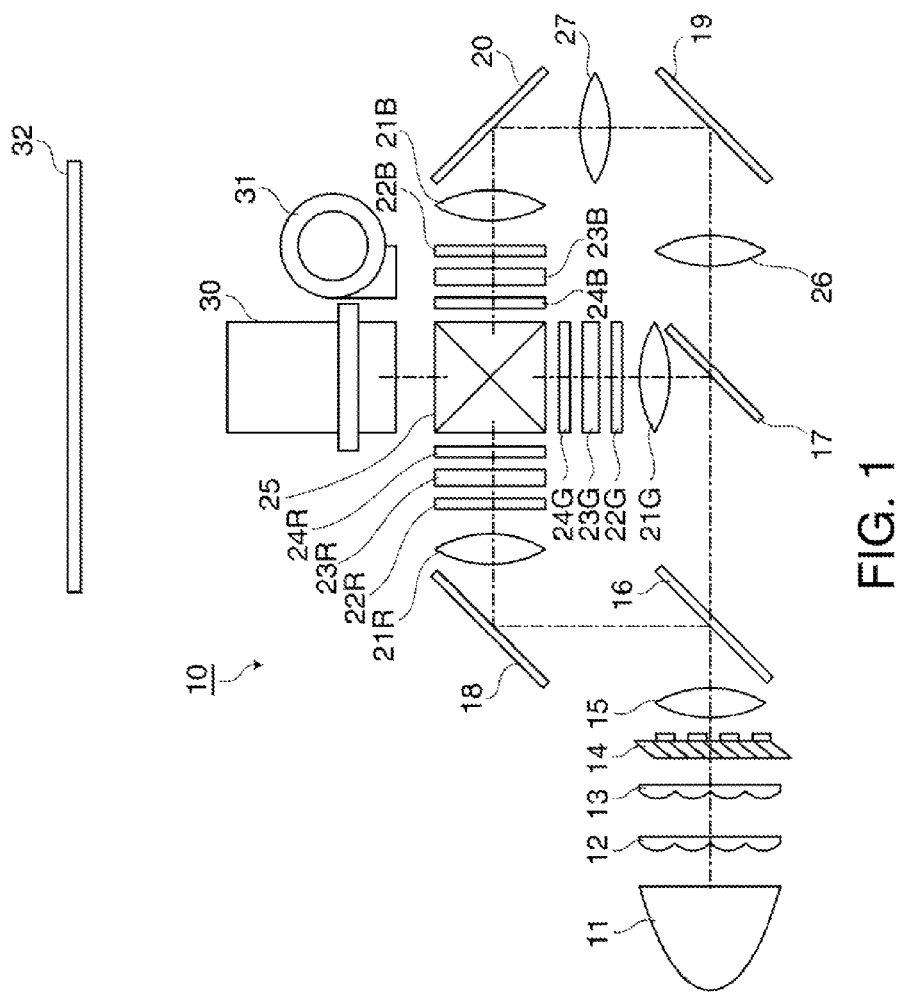
FIG. 1 shows a schematic configuration of a projector according to a first embodiment.

FIG. 1 shows a schematic configuration of a projector 10 according to a first embodiment. The projector 10 is a front-projection projector, which projects projection light onto a screen 32 and presents an image to a viewer who observes the light reflected off the screen 32. The projector 10 includes a cooling duct through which cooling air supplied from a fan 31 flows. The cooling duct will be described later in detail.

A light source 11 emits light containing R light, G light, and B light. The light source 11 is, for example, an ultra-high pressure mercury lamp. Each of a first integrator lens 12 and a second integrator lens 13 includes a plurality of lens elements arranged in an array. The first integrator lens 12 divides the light flux from the light source 11 into a plurality of sub-fluxes. Each of the lens elements in the first integrator lens 12 focuses the light flux from the light source 11 in the vicinity of the corresponding lens element in the second integrator lens 13. The lens elements in the second integrator lens 13 form images of the lens elements in the first integrator lens 12 on liquid crystal display panels 23R, 23G, and 23B.

A polarization conversion element 14 converts the light having passed through the two integrator lenses 12 and into predetermined linearly polarized light. A superimposing lens 15 superimposes the images of the lens elements in the first integrator lens 12 on illuminated surfaces of the liquid crystal display panels 23R, 23G, and 23B. The first integrator lens 12, the second integrator lens 13, and the superimposing lens 15 make the intensity distribution of the light from the light source 11 uniform on the illuminated areas of the liquid crystal display panels 23R, 23G, and 23B.

A first dichroic mirror 16 reflects the R light and transmits the G light and the B light incident thereon from the superimposing lens 15. The optical path of the R light from the superimposing lens 15 is deflected by the first dichroic mirror 16 and a reflection mirror 18, and the reflected light is incident on a field lens 21R. The field lens 21R parallelizes the R light from the reflection mirror 18, and the parallelized light is incident on a light-incident-side polarizer 22R. The light-incident-side polarizer 22R transmits predetermined linearly polarized light. The liquid crystal display panel 23R, which is a spatial light modulator, modulates the R light from the light-incident-side polarizer 22R in accordance with an image signal. A light-exiting-side polarizer 24R transmits predetermined linearly polarized light out of the light from the liquid crystal display panel 23R. The light-incident-side polarizer 22R and the light-exiting-side polarizer 24R are disposed in such a way that the axes of polarization thereof are perpendicular to each other.

A second dichroic mirror 17 reflects the G light and transmits the B light from the first dichroic mirror 16. The optical path of the G light from the first dichroic mirror 16 is deflected by the second dichroic mirror 17, and the reflected light is incident on a field lens 21G. The field lens 21G parallelizes the G light from the second dichroic mirror 17, and the parallelized light is incident on a light-incident-side polarizer 22G. The light-incident-side polarizer 22G transmits predetermined linearly polarized light. The liquid crystal display panel 23G, which is a spatial light modulator, modulates the G light from the light-incident-side polarizer 22G in accordance with an image signal. A light-exiting-side polarizer 24G transmits predetermined linearly polarized light out of the light from the liquid crystal display panel 23G.

The B light having passed through the second dichroic mirror 17 passes through a relay lens 26 and is reflected off a reflection mirror 19, where the optical path of the B light is deflected. The B light from the reflection mirror 19 passes through another relay lens 27, is reflected off a reflection mirror 20, where the optical path of the B light is deflected, and is incident on a field lens 21B. In the present embodiment, the length of the optical path for the B light is longer than those for the R light and the G light. To make the magnification of the illumination light B on the illuminated area of the liquid crystal display panel 23B equal to those of the other illumination light on the illuminated areas of the liquid crystal display panel 23R and 23G, the optical path for the B light includes a relay system formed of the relay lenses 26 and 27.

The field lens 21B parallelizes the B light from the reflection mirror 20, and the parallelized light is incident on a light-incident-side polarizer 22B. The light-incident-side polarizer 22B transmits predetermined linearly polarized light. The liquid crystal display panel 23B, which is a spatial light modulator, modulates the B light from the light-incident-side polarizer 22B in accordance with an image signal. A light-exiting-side polarizer 24B transmits predetermined linearly polarized light out of the light from the liquid crystal display panel 23B. The light-incident-side polarizers 22R, 22G, and 22B, the liquid crystal display panels 23R, 23G, and 23B, and the light-exiting-side polarizers 24R, 24G, and 24B correspond to the respective colors.

A cross dichroic prism 25, which is a light combining system, combines the R light, the G light, and the B light having exited from the light-exiting-side polarizers 24R, 24G, and 24B and outputs the combined light toward a projection lens 30. The projection lens 30, which is a projection system, projects the light combined in the cross dichroic prism 25 toward the screen 32. A fan 31, which is a cooling air supplier, supplies cooling air flowing through the cooling duct. The fan 31 may be a sirocco fan or any other fan capable of supplying cooling air.

Figure 2:
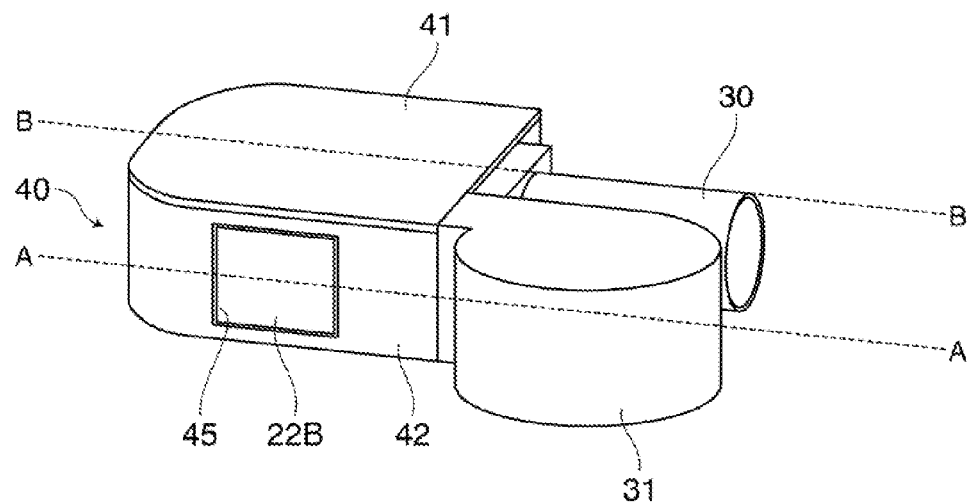
FIG. 2 is a perspective view showing the configuration of a combination of a cooling structure and a projection lens.
Figure 3:
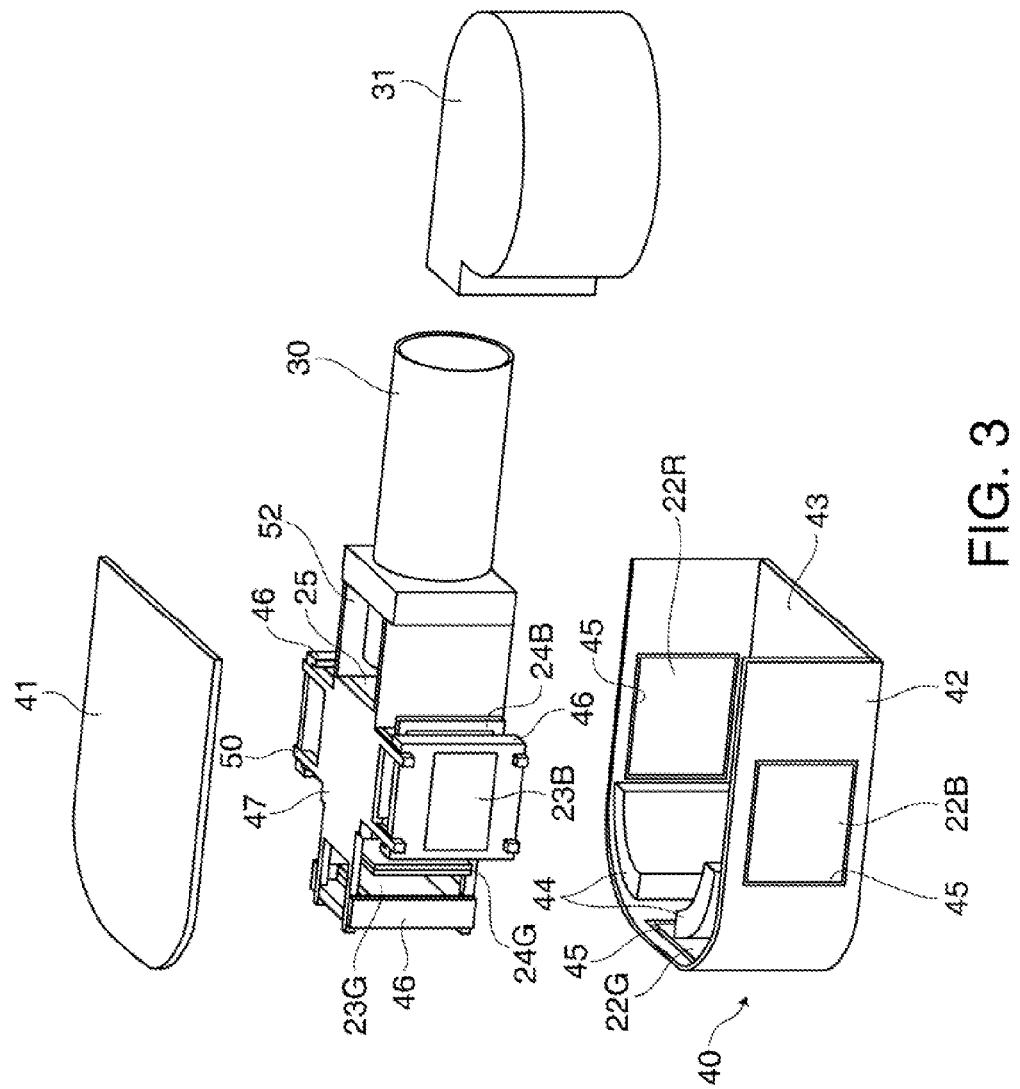
FIG. 3 is an exploded view of the configuration shown in FIG. 2.

FIG. 2 is a perspective view showing the configuration of a combination of a cooling structure and the projection lens 30 in the projector 10. FIG. 3 is an exploded view of the configuration shown in FIG. 2. The cooling structure includes the light-incident-side polarizers 22R, 22G, and 22B, the liquid crystal display panels 23R, 23G, and 23B, the light-exiting-side polarizers 24R, 24G, and 24B, and the cross dichroic prism 25, which are optical components, integrated with the cooling duct.

A base 40 and a cover member 41 form an outer shell of the cooling duct. The base 40 includes a sidewall portion 42 and a bottom portion 43. The sidewall portion 42 forms the sidewall of the cooling duct. The bottom portion 43 is a flat-plate portion that forms the bottom surface of the cooling duct. The liquid crystal display panels 23R, 23G, and 23B, the light-exiting-side polarizers 24R, 24G, and 24B, and the cross dichroic prism 25 fixed to a fixing member 47 are mounted on the bottom portion 43. The cover member 41 is a flat-plate member that forms the top surface of the cooling duct that is opposite the bottom portion 43. The cover member 41 covers the liquid crystal display panels 23R, 23G, and 23B, the light-exiting-side polarizers 24R, 24G, and 24B, and the cross dichroic prism 25 mounted on the base 40.

Figure 4:
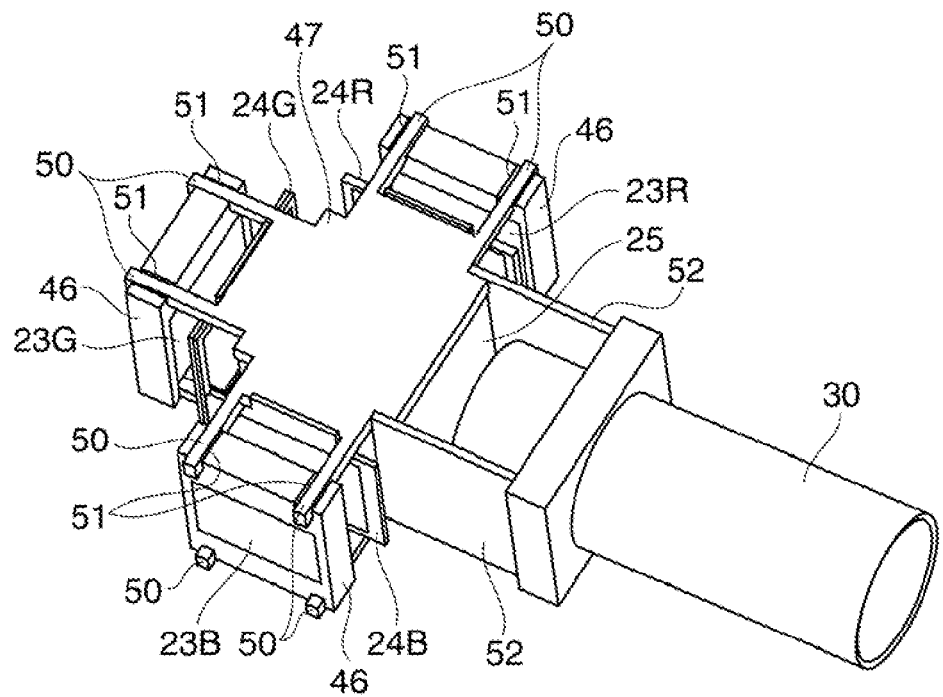
FIG. 4 shows part of the configuration shown in FIG. 2.

FIG. 4 shows part of the configuration shown in FIG. 2. FIG. 4 shows not only the configuration surrounded by the base 40 and the cover member 41 but also the projection lens 30. The liquid crystal display panels 23R, 23G, and 23B are supported by respective support frames 46. The fixing member 47 integrally fixes the liquid crystal display panels 23R, 23G, and 23B, the cross dichroic prism 25, and the projection lens 30. The fixing member 47 includes a plurality of flat-plate portions.

The cross dichroic prism 25 is sandwiched between two flat-plate portions of the fixing member 47, upper and lower flat-plate portions. The support frame 46 provided for each of the liquid crystal display panels 23R, 23G, and 23B is fixed to support frame fixing portions 50 of the fixing member 47. The support frame fixing portions 50 are elongated extensions of the fixing member 47 that extend from the portion where the cross dichroic prism 25 is fixed toward the liquid crystal display panels 23R, 23G, and 23B. The liquid crystal display panels 23R, 23G, and 23B are fixed to the support frame fixing portions 50 via the support frames 46.

Each of the support frames 46 has four recesses 51 into which the corresponding support frame fixing portions 50 fit. The recesses 51 function as attachment portions that allow the support frame fixing portions 50 to be attached to the support frame 46. The support frame 46 is fixed by two support frame fixing portions 50 extending above the cross dichroic prism 25 and two support frame fixing portions 50 extending below the cross dichroic prism 25. The projection lens 30 is fixed to a projection system fixing portion 52. The projection system fixing portion 52 is formed of right and left flat-plate portions of the fixing member 47 that sandwich the vicinity of the light-exiting surface of the cross dichroic prism 25.

The light-exiting-side polarizers 24R, 24G, and 24B are attached to the support frame fixing portions 50 and located between the liquid crystal display panels 23R, 23G, 23B and the light-incident surfaces of the cross dichroic prism 25. As a result, the light-exiting-side polarizers 24R, 24G, and 24B are fixed in the optical paths between the liquid crystal display panels 23R, 23G, 23B and the cross dichroic prism 25. The light-exiting-side polarizers 24R, 24G, and 24B are not necessarily attached to the support frame fixing portions 50 but may be attached to any portions of the fixing member 47.

Referring back to FIG. 3, openings 45 through which light passes are formed in the portions of the sidewall portion 42 that face the liquid crystal display panels 23R, 23G, and 23B. The light-incident-side polarizers 22R, 22G, and 22B are disposed in the openings 45 so that the polarizers block the openings. The light-exiting surfaces of the light-incident-side polarizers 22R, 22G, and 22B thus form part of the cooling duct. Two rectifying mechanisms 44 are disposed, one between the liquid crystal display panel 23B for B light and the liquid crystal display panel 23G for G light and the other between the liquid crystal display panel 23G for G light and the liquid crystal display panel 23R for R light. The rectifying mechanisms 44 are attached to the bottom portion 43.

Figure 5:
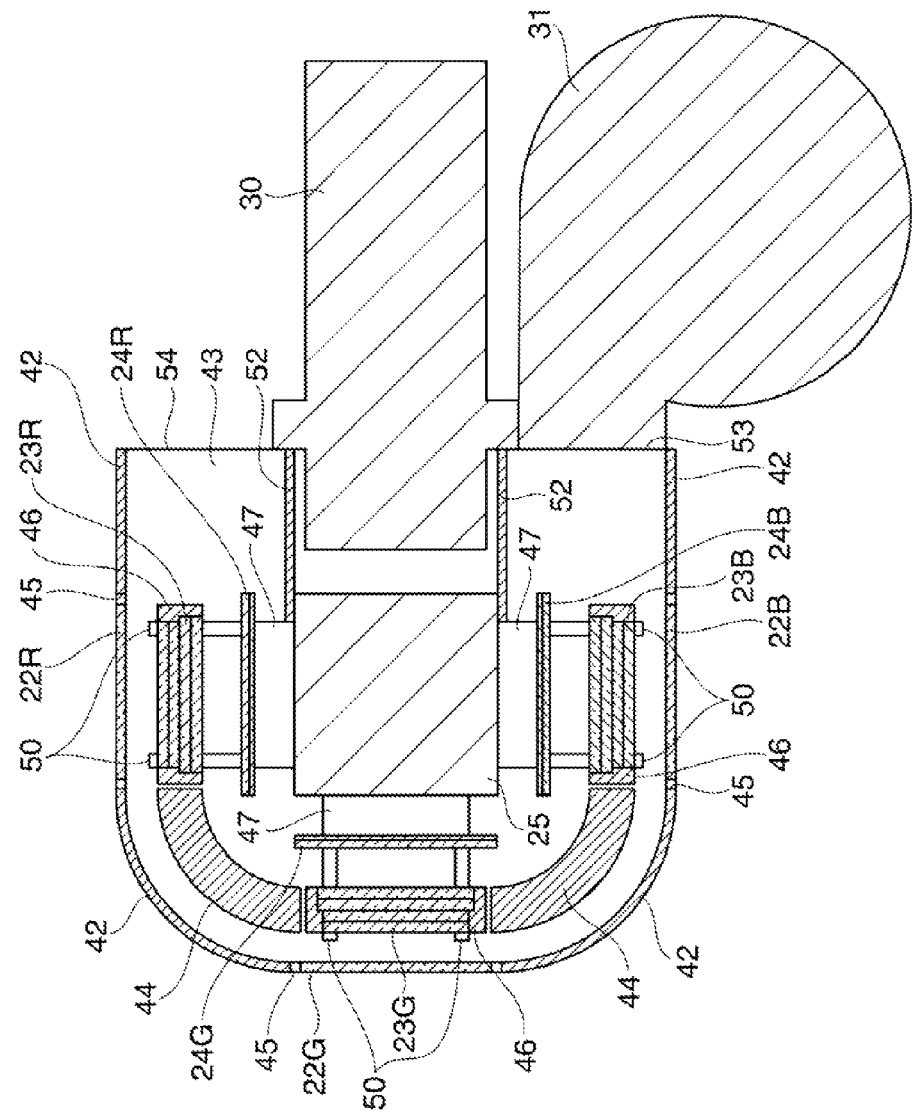
FIG. 5 is a horizontal cross-sectional view of the configuration shown in FIG. 2 taken along the line A-A.

FIG. 5 is a horizontal cross-sectional view of the configuration shown in FIG. 2 taken along the line A-A. The cooling duct is bent at two locations, one between the components for B light and those for G light and the other between the components for G light and those for R light. The inner circumferential surface of the cooling duct is formed of the light-incident surfaces of the cross dichroic prism 25. The rectifying mechanisms 44 are disposed at the respective bent portions of the cooling duct. The two rectifying mechanisms 44 divide the cooling duct into a flow path on the light-incident side of the liquid crystal display panels 23R, 23G, and 23B and a flow path on the light-exiting side thereof.

Figure 6:
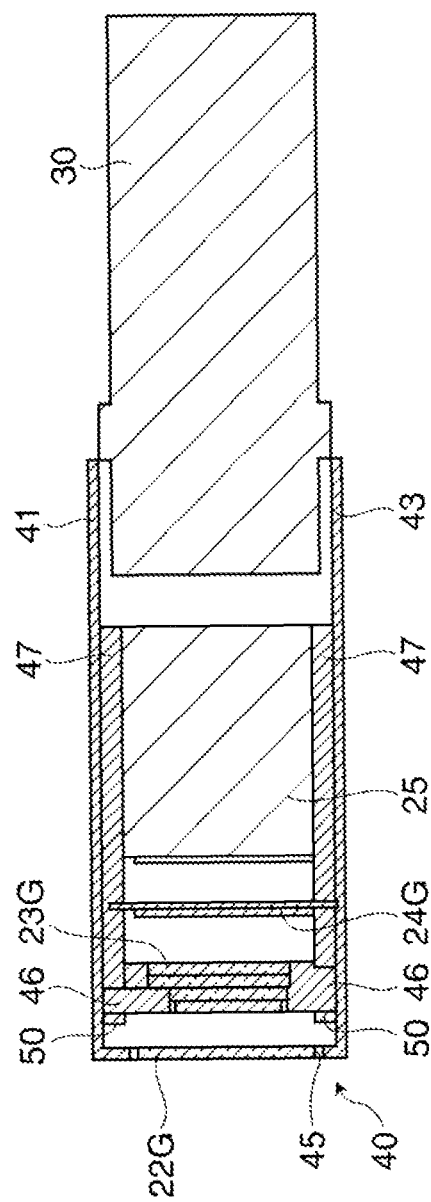
FIG. 6 is a vertical cross-sectional view of the configuration shown in FIG. 2 taken along the line B-B.

FIG. 6 is a vertical cross-sectional view of the configuration shown in FIG. 2 taken along the line B-B. The cover member 41 is in close contact with and attached to a plate-shaped portion of the fixing member 47 that is located above the cross dichroic prism 25. The bottom portion 43 of the base 40 is in close contact with and attached to a plate-shaped portion of the fixing member 47 that is located below the cross dichroic prism 25. The base 40 and the cover member 41 are thus fixed to the cross dichroic prism 25. A member that relaxes tolerance, such as an elastic member made of rubber or any other suitable material, may be disposed between the cover member 41 and the fixing member 47. In this case, the cover member 41 may be fixed to the base 40.

A description will be made of how cooling air travels in the cooling duct with reference to FIGS. 5 and 6. An inlet 53 and an outlet 54 of the cooling duct are formed of the sidewall portion 42, the bottom portion 43, the cover member 41, and the projection system fixing portion 52. The inlet 53 is an opening located on the side where the optical components for B light are present in the cooling duct. The outlet 54 is an opening located on the side where the optical components for R light are present in the cooling duct. The fan 31 supplies cooling air to the inlet 53 of the cooling duct. The traveling direction of the cooling air having passed between the light-incident surface of the liquid crystal display panel 23B for B light and the light-exiting surface of the light-incident-side polarizer 22B is deflected between the sidewall portion 42 and the outer circumferential surface of the rectifying mechanism 44 located downstream of the components for B light.

The cooling air having passed between the sidewall portion 42 and the rectifying mechanism 44 passes between the light-incident surface of the liquid crystal display panel 23G for G light and the light-exiting surface of the light-incident-side polarizer 22G, and the traveling direction of the cooling air is deflected between the sidewall portion 42 and the outer circumferential surface of the rectifying mechanism 44 located downstream of the components for G light. The cooling air having passed between the sidewall portion 42 and the rectifying mechanism 44 passes between the light-incident surface of the liquid crystal display panel 23R for R light and the light-exiting surface of the light-incident-side polarizer 22R.

The traveling direction of the cooling air having passed between the light-exiting surface of the liquid crystal display panel 23B for B light and the corresponding light-incident surface of the cross dichroic prism 25 is deflected between the inner circumferential surface of the rectifying mechanism 44 located downstream of the components for B light and the cross dichroic prism 25. The cooling air having passed between the rectifying mechanism 44 and the cross dichroic prism 25 passes between the light-exiting surface of the liquid crystal display panel 23G for G light and the corresponding light-incident surface of the cross dichroic prism 25, and the traveling direction of the cooling air is deflected between the inner circumferential surface of the rectifying mechanism 44 located downstream of the components for G light and the cross dichroic prism 25.

The cooling air having passed between the rectifying mechanism 44 and the cross dichroic prism 25 passes between the light-exiting surface of the liquid crystal display panel 23R for R light and the corresponding light-incident surface of the cross dichroic prism 25. The cooling air having passed through the light-incident side of the liquid crystal display panel 23R for R light and the cooling air having passed through the light-exiting side thereof flow out of the cooling duct through the outlet 54.

In the cross-sectional view of FIG. 6, the cooling air travels between the light-exiting surface of the light-incident-side polarizer 22G for G light and the light-incident surface of the liquid crystal display panel 23G for G light, between the light-exiting surface of the liquid crystal display panel 23G and the light-incident surface of the light-exiting-side polarizer 24G, and between the light-exiting surface of the light-exiting-side polarizer 24G and the cross dichroic prism 25. The cooling air travels through the optical components for B light and the optical components for R light in the same manner as through the optical components for G light.

The cooling air flowing through the cooling duct removes the heat generated in the light-incident-side polarizers 22R, 22G, and 22B, the liquid crystal display panels 23R, 23G, and 23B, and the light-exiting-side polarizers 24R, 24G, and 24B out of the projector 10. The rectifying mechanisms 44 provided in the cooling duct cause the cooling air to travel toward both the light-incident side and the light-exiting side of the liquid crystal display panels 23R, 23G, and 23B and can hence efficiently cool the light-incident-side polarizers 22R, 22G, and 22B, the liquid crystal display panels 23R, 23G, and 23B, and the light-exiting-side polarizers 24R, 24G, and 24B.

The procedure of assembling the configuration shown in FIG. 2 will next be described with reference to FIGS. 3 and 4. The configuration shown in FIG. 4 has been assembled before the base 40 and the cover member 41 shown in FIG. 3 are attached. The liquid crystal display panels 23R, 23G, and 23B, the light-exiting-side polarizers 24R, 24G, and 24B, the cross dichroic prism 25, and the projection lens 30 are integrally fixed to the fixing member 47. The liquid crystal display panels 23R, 23G, and 23B and the projection lens 30 are fixed with the positions thereof relative to the cross dichroic prism 25 adjusted via the fixing member 47.

The liquid crystal display panels 23R, 23G, and 23B are fixed to the fixing member 47 via the support frames 46. The recesses 51 are formed in such a way that the width thereof is slightly larger than that of the support frame fixing portions 50. The positions of the liquid crystal display panels 23R, 23G, and 23B are finely adjusted by changing the positions of the recesses 51 relative to the support frame fixing portions 50. After the positions of the liquid crystal display panels 23R, 23G, and 23B are adjusted, an adhesive member (not shown) filled in the gap between each of the recesses 51 and the corresponding support frame fixing portion 50 is solidified. The liquid crystal display panels 23R, 23G, and 23B are thus fixed after the positions thereof relative to the cross dichroic prism 25 are adjusted by using the gaps between the recesses 51 and the support frame fixing portions 50.

In this way, the cross dichroic prism 25 and the liquid crystal display panels 23R, 23G, and 23B can be fixed in a simple configuration in such a way that they are precisely positioned with respect to each other. The shapes of the support frame fixing portions 50 and the recesses 51 are not limited to those illustrated but can be changed as appropriate. The attachment portion formed in each of the support frames 46 may not be the recess 51 but may be any other configuration to which the corresponding support frame fixing portion 50 can be attached. The attachment portion may, for example, be a through hole into which the support frame fixing portion 50 can be inserted. The number of attachment portions and support frame fixing portions 50 and the positions thereof are not limited to those described in the present embodiment but may be changed as appropriate.

The liquid crystal display panels 23R, 23G, and 23B and the cross dichroic prism 25 integrally fixed to the fixing member 47 are mounted on the bottom portion 43 of the base 40 via the fixing member 47. The components mounted on the base 40 are then covered with the cover member 41 by attaching the cover member 41. The cover member 41 is in close contact with and attached to the plate-shaped portion of the fixing member 47 that is located above the cross dichroic prism 25. The cooling duct including the rectifying mechanisms 44 is formed by combining the base 40, to which the rectifying mechanisms 44 have been attached in advance, with the cover member 41. The fan 31 is further attached to the inlet 53. The rectifying mechanisms 44 are not necessarily attached to the base 40 but may instead be attached to the cover member 41.

The thickness of the projector 10 can be reduced by employing the configuration in which the cooling air sequentially travels toward the liquid crystal display panels 23R, 23G, and 23B and other components and arranging the fan 31, the cooling duct, and the optical components, which are objects to be cooled, in the horizontal direction. Further, the configuration described in the present embodiment allows the configuration for fixing the optical components and the configuration for cooling the optical components to be assembled. The assembled projector 10 thus advantageously includes the cooling structure that allows the thickness of the projector 10 to be reduced and the configuration that allows the optical components to be fixed.

The cooling air does not necessarily travel through the optical components for the RGB colors in the order described in the present embodiment. The order in which the cooling air travels may be changed as appropriate in accordance with the arrangement of the optical components for the RGB colors. The cooling duct is not necessarily configured in such a way that the inlet 53 is the opening on the side where the optical components for B light are present and the outlet 54 is the opening on the side where the optical components for R light are present. The cooling duct may be configured in such a way that the inlet 53 is the opening on the side where the optical components for R light are present and the outlet 54 is the opening on the side where the optical components for B light are present. The position of the fan 31 may be changed as appropriate in accordance with the position of the inlet 53.

Second Embodiment

Figure 7:
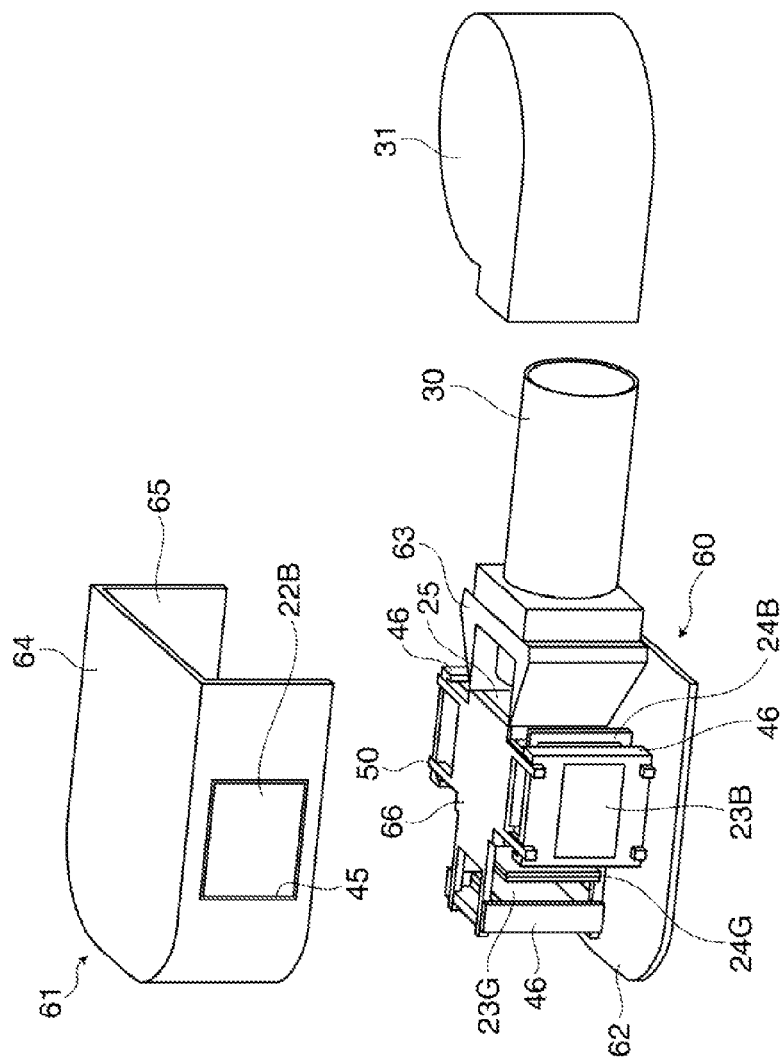
FIG. 7 is an exploded view showing a cooling structure and other components in a projector according to a second embodiment.

FIG. 7 is an exploded view showing a cooling structure and a projection lens 30 in a projector according to a second embodiment. In the present embodiment, a base 60 onto which the projection lens 30 is fixed and a cover member 61 form a cooling duct. The same portions as those in the first embodiment have the same reference characters, and no redundant description of those portions will be made.

The base 60 and the cover member 61 form an outer shell of the cooling duct. The base 60 includes a bottom portion 62 and a projection system fixing portion 63. The bottom portion 62 is a flat-plate portion that forms the bottom surface of the cooling duct. The liquid crystal display panels 23R, 23G, and 23B, the light-exiting-side polarizers 24R, 24G, and 24B, and the cross dichroic prism 25 fixed to a fixing member 66 are mounted on the bottom portion 62. The projection system fixing portion 63 is formed on the bottom portion 62 of the base 60. The projection system fixing portion 63, which is a portion into which the projection lens 30 can be inserted, fixes the projection lens 30 to the base 60.

The cover member 61 covers the liquid crystal display panels 23R, 23G, and 23B, the light-exiting-side polarizers 24R, 24G, and 24B, and the cross dichroic prism 25 mounted on the base 60. The cover member 61 includes a top surface portion 64 and a sidewall portion 65. The top surface portion 64 is a flat-plate portion that forms the top surface of the cooling duct that is opposite the bottom portion 62. The sidewall portion 65 forms the sidewall of the cooling duct.

Figure 8:
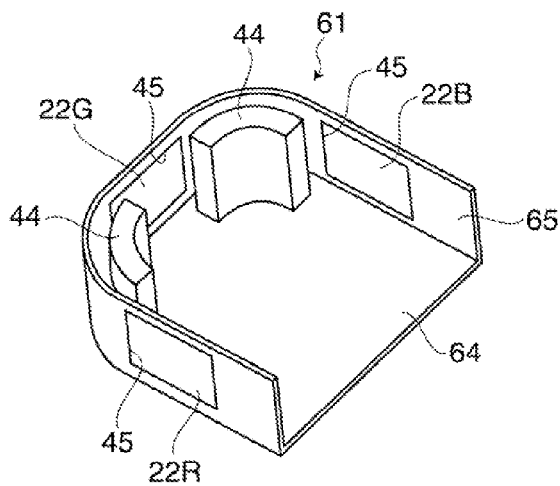
FIG. 8 is a perspective view of a cover member viewed from the rear side of the cover member shown in FIG. 7.

FIG. 8 is a perspective view of the cover member 61 viewed from the rear side of the cover member 61 shown in FIG. 7. Openings 45 through which light passes are formed in the portions of the sidewall portion 65 that face the liquid crystal display panels 23R, 23G, and 23B. The light-incident-side polarizers 22R, 22G, and 22B are disposed in the openings 45 so that the polarizers block the openings. The light-exiting surfaces of the light-incident-side polarizers 22R, 22G, and 22B thus form part of the cooling duct. Rectifying mechanisms 44 are attached to the top surface portion 64. When the base 60 and the cover member 61 are combined, one of the rectifying mechanisms 44 is disposed between the liquid crystal display panel 23B for B light and the liquid crystal display panel 23G for G light, and the other is disposed between the liquid crystal display panel 23G for G light and the liquid crystal display panel 23R for R light.

Figure 9:
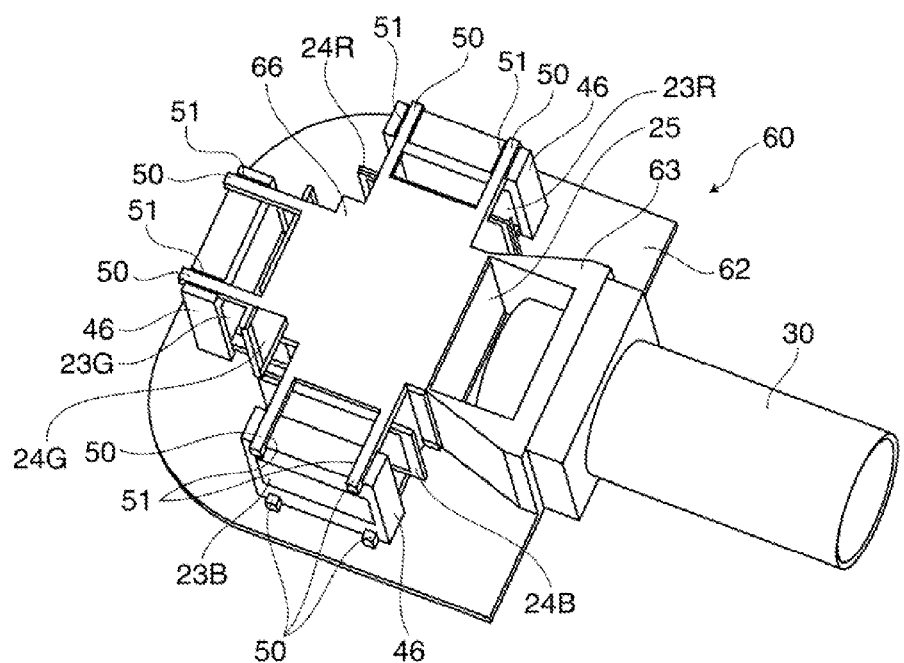
FIG. 9 shows part of the configuration shown in FIG. 7.

FIG. 9 shows part of the configuration shown in FIG. 7. FIG. 9 shows the components mounted on the base 60 and the projection lens 30 fixed to the base 60. The fixing member 66 includes two flat-plate portions. The cross dichroic prism 25 is sandwiched between the two flat-plate portions of the fixing member 66, upper and lower flat-plate portions. The portion of the projection system fixing portion 63 that faces the cross dichroic prism 25 is connected to the two flat-plate portions of the fixing member 66 and the vicinity of the light-exiting surface of the cross dichroic prism 25.

Figure 10:
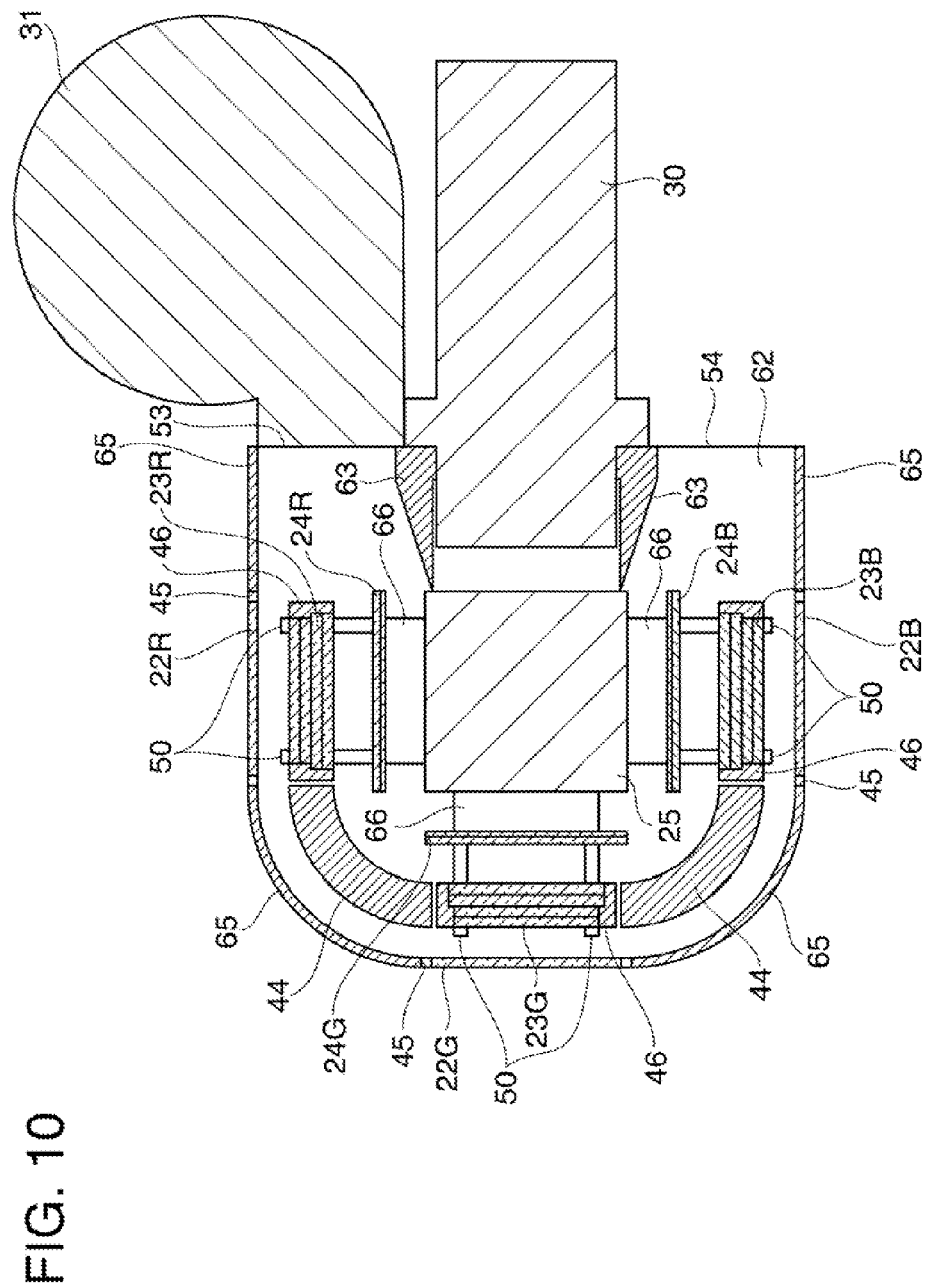
FIG. 10 is a horizontal cross-sectional view showing the configuration of a combination of a cooling structure and a projection lens.

FIG. 10 is a horizontal cross-sectional view showing the configuration of a combination of the cooling structure and the projection lens 30. An inlet 53 and an outlet 54 of the cooling duct are formed of the sidewall portion 65, the top surface portion 64, the bottom portion 62, and the projection system fixing portion 63. The inlet 53 is an opening located on the side where the optical components for R light are present in the cooling duct. The outlet 54 is an opening located on the side where the optical components for B light are present in the cooling duct.

The cooling air supplied through the inlet 53 into the cooling duct sequentially travels through the optical components for R light, the optical components for G light, and the optical components for B light and flows out of the cooling duct through the outlet 54. In the present embodiment, the cooling air travels in the opposite direction to that in the first embodiment. The cooling duct may alternatively be configured in such a way that the inlet 53 is located on the side where the optical components for B light are present and the outlet 54 is located on the side where the optical components for R light are present with the cooling air traveling in the same direction as that in the first embodiment.

The procedure of assembling the configuration described in the present embodiment will next be described with reference to FIGS. 7 to 9 and 11. The configuration shown in FIG. 9 has been assembled before the cover member 61 shown in FIGS. 7 and 8 is attached. The projection lens 30 is fixed to the projection system fixing portion 63. The cross dichroic prism 25 and the light-exiting-side polarizers 24R, 24G, and 24B are mounted on the bottom portion 62 of the base 60 after they are attached to the fixing member 66. The projection lens 30 and the cross dichroic prism 25 are fixed with the positions thereof adjusted with respect to each other.

Figure 11:
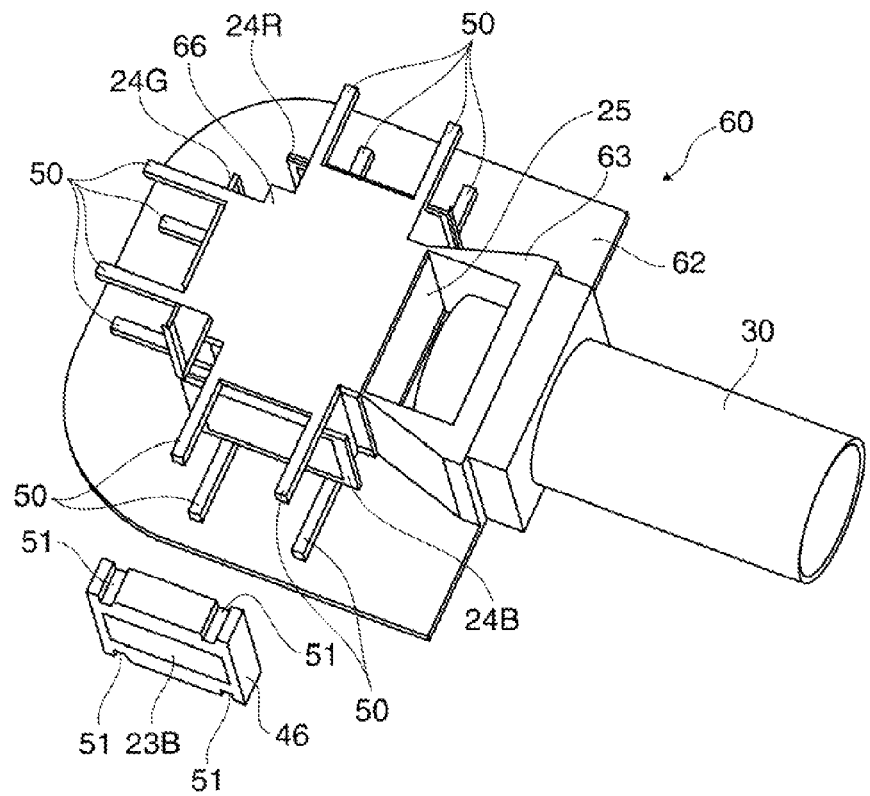
FIG. 11 describes how to attach liquid crystal display panels.

FIG. 11 describes how to attach the liquid crystal display panels 23R, 23G, and 23B. The liquid crystal display panels 23R, 23G, and 23B are attached to the fixing member 66 after the cross dichroic prism 25 attached to the fixing member 66 is mounted on the base 60. In the present embodiment, the liquid crystal display panels 23R, 23G, and 23B are advantageously attached after the projection lens 30 and the cross dichroic prism 25 are securely fixed to the base 60 and stabilized thereon. Other advantages are provided in the present embodiment as follows: The sidewall portion 65 does not obstruct the operation of attaching the liquid crystal display panels 23R, 23G, and 23B, and the fact that the rectifying mechanisms 44 do not accidentally come into contact with the liquid crystal display panels 23R, 23G, and 23B at this point prevents the liquid crystal display panels 23R, 23G, and 23B from being shifted.

The components mounted on the base 60 are then covered with the cover member 61 by attaching the cover member 61. The cover member 61 is in close contact with and attached to a plate-shaped portion of the fixing member 66 that is located above the cross dichroic prism 25. The rectifying mechanisms 44 have been attached in advance to the cover member 61, as shown in FIG. 8. The cooling duct including the rectifying mechanisms 44 is formed by combining the base 60 with the cover member 61. The fan 31 is further attached to the inlet 53. The rectifying mechanisms 44 are not necessarily attached to the cover member 61 but may instead be attached to the base 60. In the present embodiment as well, the assembled projector includes the cooling structure that allows the thickness of the projector to be reduced and the configuration that allows the optical components to be fixed.

Figure 12:
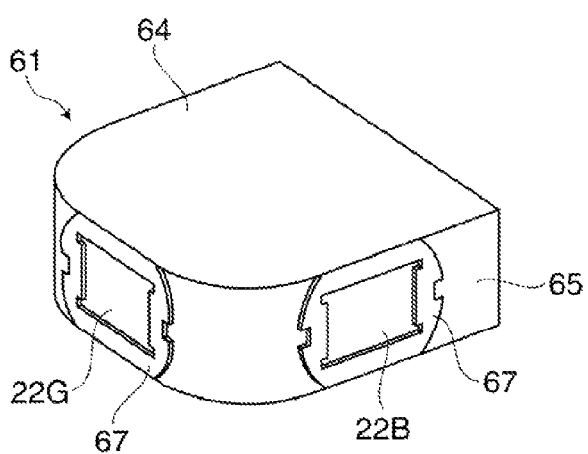
FIG. 12 is a perspective view of a cooling structure according to a variation of the second embodiment.

FIG. 12 is a perspective view of a cooling structure according to a variation of the present embodiment. Each of the light-incident-side polarizers 22R, 22G, and 22B is attached to the sidewall portion 65 via a light-incident-side polarizer frame 67. The light-incident-side polarizer frame 67 is fixed to the sidewall portion 65 after the inclination of the corresponding light-incident-side polarizer is adjusted in the rotational direction around the optical axis. The optical axis is an axis perpendicular to the light-incident surfaces of the liquid crystal display panels 23R, 23G, and 23B and passing through the centers of the illuminated areas of the liquid crystal display panels 23R, 23G, and 23B.

Figure 13:
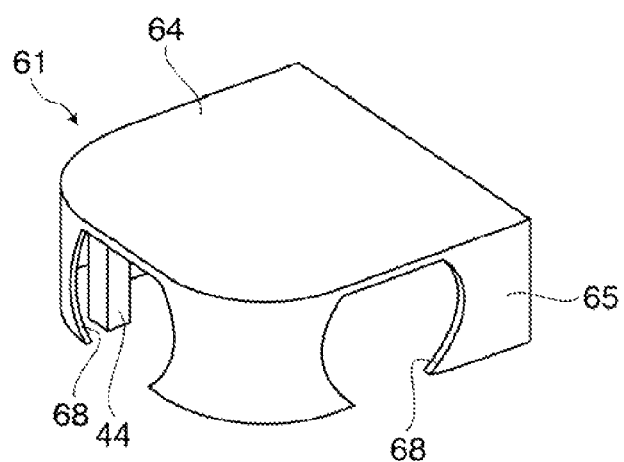
FIG. 13 is a perspective view of a cover member from which light-incident-side polarizer frames are removed.

FIG. 13 is a perspective view of the cover member 61 from which the light-incident-side polarizer frames 67 are removed. A cutout 68 is provided in the portion of the sidewall portion 65 to which each of the light-incident-side polarizer frames 67 is attached. The cutout 68 is formed by cutting a lower portion of the sidewall portion 65 in accordance with the shape of the light-incident-side polarizer frame 67. The portion of the cutout 68 between the side to be joined with the base 60 and the top surface portion 64 has an arcuate shape.

Figure 14:
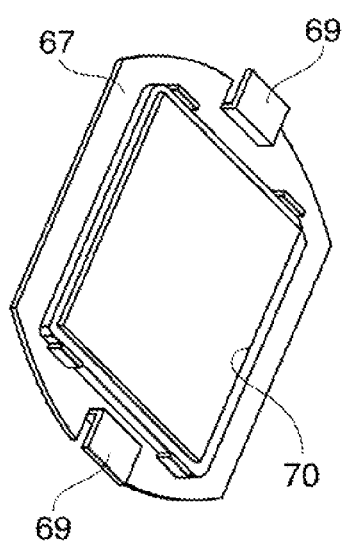
FIG. 14 is a perspective view of one of the light-incident-side polarizer frames viewed from the side facing the interior of a cooling duct.

FIG. 14 is a perspective view of one of the light-incident-side polarizer frames 67 viewed from the side facing the interior of the cooling duct. A rectangular opening 70 is provided at the center of the light-incident-side polarizer frame 67. The light-incident-side polarizers 22R, 22G, and 22B are disposed in the openings 70 so that the polarizers block the openings. A bent portion 69 is provided on right and left side portions of each of the light-incident-side polarizer frames 67. Each of the bent portions 69 has a shape that is bent in accordance with the thickness of the member that forms the sidewall portion 65.

The light-incident-side polarizer frames 67 are inserted through the lower side of the respective cutouts 68 toward the top surface portion 64 with the light-incident-side polarizers 22R, 22G, and 22B disposed in the openings 70. The light-incident-side polarizer frames 67 are attached to the sidewall portion 65 when each of the bent portions 69 fits on the edge of the sidewall portion 65 that extends along the cutout 68. The bent portion 69 can fit on the sidewall portion 65 and slide along the arcuate portion of the cutout 68. The light-incident-side polarizer frames 67 can be rotated around the optical axis while the bent portions 69 slide along the sidewall portion 65. The inclination angles of the light-incident-side polarizers 22R, 22G, and 22B are thus finely adjusted in the rotational direction around the optical axis.

The light-incident-side polarizer frames 67 are fixed to the sidewall portion 65 with an adhesive or any other suitable material after the inclination angles of the light-incident-side polarizers 22R, 22G, and 22B are adjusted. In this way, the orientation of the axis of polarization of each of the light-incident-side polarizers 22R, 22G, and 22B can be finely adjusted in a simple configuration, whereby the light-incident-side polarizers 22R, 22G, and 22B can be fixed with the inclination thereof precisely adjusted. The position, number, and shape of the bent portions 69 are not limited to those described in the present embodiment but may be changed as appropriate. Further, the mechanism that allows the light-incident-side polarizer frames 67 to rotate is not necessarily the bent portions 69, but any other suitable mechanism may be used. The present variation is applicable to the first embodiment.

The entire disclosure of Japanese Patent Application No. 2009-185501, filed Aug. 10, 2009 is expressly incorporated by reference herein.

What is claimed is:

1. A projector comprising:
a spatial light modulator provided for each of a plurality of color light fluxes, each of the spatial light modulators being configured to modulate the corresponding color light flux in accordance with an image signal;
a light combining system configured to combine the color light flux outputted from the spatial light modulators;
a projection system configured to project the light combined by the light combining system;
a pair of fixing members configured to integrally fix the spatial light modulators, the light combining system, and the projection system, each of the pair of fixing members including:
a plate portion extending along a side of the light combining system, and
a plurality of fixing portions protruding from the plate portion, each of the plurality of fixing portions extending to a region adjacent one of the spatial light modulators;
a base on which the spatial light modulators and the light combining system fixed to the pair of fixing members are mounted;
a cover member configured to cover the spatial light modulators and the light combining system mounted on the base;
a light-incident-side polarizer provided for the respective color light flux and attached to a sidewall portion of the base; and
a projection system fixing portion configured to fix the projection system and sandwich the pair of fixing members and the light combining system, the projection system fixing portion being disposed in a vicinity of the light-exiting surface of the light combining system and abutting two light-incident surfaces of the light combining system,
wherein
the base, the cover member, and the projection system fixing portion form a cooling duct through which cooling air for sequentially cooling each spatial light modulator for the respective color light flux flows, and
the light-incident-side polarizer is rotatable around an optical axis of the corresponding color light flux.

2. The projector according to claim 1, further comprising a support frame configured to support the spatial light modulators,
wherein each fixing member of the pair of fixing members has a support frame fixing portion configured to fix the support frame.

3. The projector according to claim 2, further comprising:
a light-exiting-side polarizer provided for the respective color light flux and on which the light flux outputted from the spatial light modulator is incident;
wherein the light-exiting-side polarizer is attached to the fixing member.

4. The projector according to claim 2, wherein a portion of the projection system fixing portion is disposed between the light combining system and the support frame.

5. The projector according to claim 1,
wherein the support frame includes an attachment portion configured to allow the support frame fixing portion to be attached to the support frame, and
the spatial light modulators are fixed after a position thereof relative to the light combining system is adjusted in response to a gap between the attachment portion and the support frame fixing portion.

6. The projector according to claim 1, further comprising:
a rectifying mechanism provided between the spatial light modulators and causing the cooling air to flow through the light-incident side and the light-exiting side of the spatial light modulators.

7. The projector according to claim 6, wherein the rectifying mechanism is attached to either the base or the cover member.

8. The projector according to claim 1, further comprising a cooling air supplier configured to supply the cooling air.

9. The projector according to claim 1, wherein the fixing portions each have a top surface formed in substantially the same plane as a top surface of the plate portion.

10. A projector comprising:
a spatial light modulator provided for each of a plurality of color light fluxes, each of the spatial light modulators being configured to modulate the corresponding color light flux in accordance with an image signal;
a light combining system configured to combine the color light fluxes outputted from the spatial light modulators;
a projection system configured to project the light combined by the light combining system;
a pair of fixing members configured to integrally fix the spatial light modulators and the light combining system, each of the pair of fixing members including:
a plate portion extending along a side of the light combining system, and
a plurality of fixing portions protruding from the plate portion, each of the plurality of fixing portions extending to a region adjacent one of the spatial light modulators;
a base on which the spatial light modulators and the light combining system fixed to the pair of fixing members are mounted and to which the projection system is fixed;
a cover member configured to cover the spatial light modulators and the light combining system mounted on the base;
a light-incident-side polarizer provided for the respective color light flux and attached to a sidewall portion of the cover member; and
a projection system fixing portion configured to be a portion into which the projection system is inserted and to fix the projection system to the base, the projection system fixing portion abutting a light-exiting surface of the light combining system,
wherein
the base, the cover member, and the projection system fixing portion form a cooling duct through which cooling air for sequentially cooling each spatial light modulator for the respective color light flux flows, and
the light-incident-side polarizer is rotatable around an optical axis of the corresponding color light flux.

11. A projector comprising:
a spatial light modulator provided for each of a plurality of color light fluxes, each of the spatial light modulators being configured to modulate the corresponding color light flux in accordance with an image signal;
a light-incident-side polarizer provided for the respective color light flux and on which light flux traveling toward the spatial light modulators are incident;
a light-incident-side polarizer frame configured to allow the light-incident-side polarizers to be attached, the light-incident-side polarizer frame including:
a pair of bent portions provided on side portions of the light-incident-side polarizer frame;

a light combining system configured to combine the color light flux outputted from the spatial light modulators;

a base on which the spatial light modulators and the light combining system are mounted;

a cover member configured to cover the spatial light modulators and the light combining system mounted on the base; and a side wall portion provided at a light incident side of each spatial light modulator and extending between the cover member and the base, wherein:
the side wall portion includes a cutout at a position opposite to the spatial light modulator,
the cutout has an arcuate shape, and
the pair of bent portions are configured to fit on the side wall portion and slide along the arcuate portion of the cutout.

* * * * *